United States Patent
Vishin

(10) Patent No.: US 6,311,280 B1
(45) Date of Patent: Oct. 30, 2001

(54) LOW-POWER MEMORY SYSTEM WITH INCORPORATED VECTOR PROCESSING

(75) Inventor: Sanjay Vishin, Sunnyvale, CA (US)

(73) Assignee: nBand Communications, Mountain View, CA (US)

(*) Notice: Subject to any disclaimer, the term of this patent is extended or adjusted under 35 U.S.C. 154(b) by 0 days.

(21) Appl. No.: 09/255,031

(22) Filed: Feb. 22, 1999

(51) Int. Cl.[7] .................................................. G06F 1/26

(52) U.S. Cl. ..................... 713/320; 711/106; 711/133; 711/143; 711/141; 712/2; 712/207; 365/222

(58) Field of Search .................................. 711/105, 106, 711/135, 143, 118, 144, 145, 141, 142, 133, 134, 137; 712/2, 207; 365/222; 713/320

(56) References Cited

U.S. PATENT DOCUMENTS

| | | | |
|---|---|---|---|
| 4,888,679 | * 12/1989 | Fossum et al. | 364/200 |
| 4,928,239 | 5/1990 | Baum et al. | 364/200 |
| 5,452,441 | * 9/1995 | Esposito et al. | 395/182.11 |
| 5,469,559 | * 11/1995 | Parks et al. | 395/433 |
| 5,623,633 | * 4/1997 | Zeller et al. | 395/473 |
| 5,649,144 | * 7/1997 | Gostin et al. | 395/421.1 |
| 5,809,562 | * 9/1998 | Gaskins et al. | 711/207 |
| 6,020,916 | * 2/2000 | Gerszberg et al. | 348/15 |
| 6,134,167 | * 10/2000 | Atkinson | 365/222 |

FOREIGN PATENT DOCUMENTS 0 817 066 A2   7/1998   (EP).

OTHER PUBLICATIONS

Chiueh, T. "A Vector Memory System Based on Wafer Scale Integrated Memory Arrays." Mar. 10, 1993. Computer Science Department State University of New York At Stony Brook.

Klaiber et al. "An Architecture for Software–Controlled Data Prefetching." May 19, 1991. Computer Architecture News.

* cited by examiner

Primary Examiner—Hiep T. Nguyen
(74) Attorney, Agent, or Firm—Michael A. Glenn

(57) ABSTRACT

A battery-powered portable radio device saves on the overall power consumed by the whole device by skipping unnecessary read, write, and refresh cycles of the internal main memory DRAM core. Streaming data input from a radio receiver is analyzed by a vector processor. The DRAM main memory and the vector processor itself share real estate on a common semiconductor chip. This allows a very wide row of DRAM memory to communicate 1024 bits wide with an eight-line cache. Six lines of the cache are reserved for memory operations, and two lines are reversed for I/O operations. Streaming data from the radio receiver is stored up in the DRAM main memory via the two I/O cache lines. As raw data is needed by the vector processor, whole DRAM rows are downloaded to the six lines of memory cache. The single-instruction multiple data vector processor rolls intermediate data around through the cache without causing it to write back to the DRAM. Any lines in the cache that will never be needed again, or that will be overwritten, are not written back. Any rows of data in the DRAM that will never be read or that will be overwritten are not refreshed. Each skipped read, write, or refresh of a row in the DRAM main memory saves significant battery power overall.

13 Claims, 6 Drawing Sheets

LOW-POWER MEMORY SYSTEM WITH INCORPORATED VECTOR PROCESSING

BACKGROUND OF THE PRESENT INVENTION

1. Technical Field

The present invention relates to low-power battery operated vector processors, and more particularly to methods and devices for reducing the power consumed by dynamic random access memories to benefit portable, battery powered equipment.

2. Description of the Prior Art

In the past, vector processors found their greatest uses in very expensive, energy-hungry supercomputers like those designed by Cray Research. Vector processors represent a subclass of single instruction multiple data (SIMD) systems that can use arrays of specially structured central processing units (CPU's) to act on large data vectors, rather than on single data items. It has only recently become practical to use vector processors in battery-powered portable equipment.

Digital signal processing techniques are now being employed in cellular telephone and other radio applications. Unfortunately, high CPU clock speeds increase power consumption and shorten battery life to unacceptable levels. Using vector processors to do the digital signal processing has been challenging, first because the overall power consumption of their data memories is high and second, because getting enough memory bandwidth at the processor interface has been difficult and expensive to implement.

At the current stage of semiconductor integrated circuit technology, it is now possible to integrate a fully functional vector processor with its main memory. For example, Duncan G. Elliott, W. Martin Snelgrove, and Michael Stumm, commented on such an architecture in, "Computational RAM: A Memory-SIMD Hybrid and its Application to DSP," IEEE Proceedings of the Custom Integrated Circuits Conference, pp. 30.6.1–30.6.4, Boston, Mass., May 1992. Computational RAM (C-RAM), as the authors refer to it, is conventional RAM with SIMD processors added to the sense amplifiers. Bit-serial, externally programmed processors added only a small amount of area to a prototype chip of theirs. When such were incorporated in a 32M byte memory, the combination was capable of an aggregate performance of 13,000,000,000, 32-bit operations per second. Such chip is extendible and completely software programmable. The cited paper describes the C-RAM architecture, a working 8K bit prototype, a full scale C-RAM designed in a 4M bit DRAM process, and various C-RAM applications.

Duncan G. Elliott reported that he has a doctoral thesis in preparation at the University of Alberta on his website on the Internet, at "http://nyquist.ee.ualberta.ca/~elliott/cram". He describes his work as being related to C-RAM. Processors are incorporated into the design of semiconductor random access memory to build an inexpensive massively-parallel computer. Mr. Elliot states that if an application contains sufficient parallelism, it will typically run orders of magnitude faster in C-RAM than the central processing unit. His work includes architecture, prototype chips, compiler and applications. C-RAM integrates SIMD processors into random access memory at the sense amplifiers along one edge of a two-dimensional array of memory cells. The so-called "novel" combination of processors with memory allows C-RAM to be used as computer main memory, as a video frame buffer, and in stand-alone signal processing. The use of high-density commodity dynamic memory is claimed to make C-RAM implementations economical. Bit-serial, externally programmed processing elements add only slightly to the cost of the chip (9–20%). A working 64-processing element per chip C-RAM has been fabricated, and the processing elements for a 2048- processing element, 4M bit chip has been designed. The performance of C-RAM for kernels and real applications was obtained by simulating their execution. For this purpose, a prototype compiler was written. Applications are drawn from the fields of signal and image processing, computer graphics, synthetic neural networks, CAD, data base and scientific computing.

Single instruction multiple data (SIMD) machine systems often have 1,024 to 16,384 processing units that all may execute the same instruction on different data in lock-step. So, a single but very wide instruction can manipulate a large data vector in parallel. Examples of SIMD machines are the CPP DAP Gamma and the MasPar MP-2. Vector processors are generally regarded as SIMD machines, and examples of such systems include the Convex C410, and the Hitachi S3600.

When the bandwidth between memory and a vector processor unit (VPU) is too small, the VPU has to wait for operands and/or has to wait before it can store results. When the ratio of arithmetic to load/store operations is not high enough to compensate, performance suffers severely. Since it has been very expensive to design high bandwidth datapaths between memory and VPU's, compromises are often sought. Prior art systems that have the full required bandwidth are very rare, e.g., ones that can do two load and a store operation at the same time.

In 1996, Aad J. van der Steen and Jack J. Dongarra, both of Rice University, wrote that the majority of vector processors no longer employ caches because their vector units cannot use caches to advantage. Vector execution speed are often slowed due to frequent cache overflows. They also reported that all present-day vector processors use vector registers, even though in the past many vector processors loaded their operands directly from memory and immediately stored the results in memory, e.g., the CDC Cyber 205, ETA-10.

VPU's usually include a number of vector functional units, or "pipes" for particular functions. Pipes are also included for memory access to guarantee the timely delivery of operands to the arithmetic pipes and the storing of results in memory. Several arithmetic functional units are usually included for integer/logical arithmetic, floating-point addition, multiplication and/or compound operation. Division can be approximated in a multiply pipe. A mask pipe is often included to select subsets of vector elements that are to be used in vector operands.

Dynamic random access memories (DRAM's) are now the main type of memory device used in computer systems, at least in part, because their one-transistor per memory cell construction permits a maximum of memory storage to be designed onto a chip. Each memory cell uses a capacitor to store a voltage that represents a digital bit value. Because the capacitors are very small, a refresh must b e periodically performed to rewrite each bit. Otherwise, the information written in the memory is lost due to drifts and leakage that occur in such circuits. Most such DRAM's use circuits that unavoidably destroy the data in each memory cell when it is read out. Thus, a write-back cycle is needed to return the data to its original condition for other accesses.

It has been common practice in DRAM design to organize the memory cells into equal numbers of rows and columns, forming a square area on the chip die. A 1 M-bit DRAM is therefore roughly organized as 1K-by-1K, depending on the height and width of each cell. Access to such memory involves selecting whole rows where only a portion of the whole number of columns are manipulated at any one access. Row decoders are used to select which row in a memory core is to be accessed and column decoders are used to select the columns that match the system memory address. Sense amplifiers and latches are used to read and hold the data values in peripheral circuits, because the way the data are stored in the individual memory cells is incompatible with the external logic levels.

A principle reason that DRAM designers have been interested in reducing the power consumption of devices is to keep the heat dissipation to reasonable levels. With more than a million bits per DRAM chip now common, whatever power is dissipated in each memory cell is multiplied by a million or more for the whole chip. For example, Katsutaka Kimura, et aL, describe various power reduction techniques that are conventional in DRAM design in their article, *Power Reduction Techniques in Megabit DRAM's,* IEEE Journal of Solid-State Circuits, Vol. SC-21, No. 3, pp. 381–388 (June 1986). They seem to settle on using CMOS technology with half-Vcc precharge as their preferred solution for DRAM's over 1 M-bit.

Another similar discussion is by Kiyoo Itoh, et al. in *Trends in Low-Power RAM Circuit Technologies,* Proceedings of the IEEE, Vol. 83, No. 4, pp. 524–543 (April 1995). This article describes how lowering RAM memory power consumption can be helpful in portable battery powered equipment. The focus is on ways the charging capacitance, operating voltage, and DC static current can all be reduced to save on the overall power consumed by a RAM. A preferred method here for reducing power consumption is to use partial activation of multi-divided data-line and shared I/O circuits.

The popularity of portable computers and devices powered by batteries has been increasing. But batteries with very high energy storage capability continue to elude designers. So the answer to longer operational battery life is to draw less power for a given application. Thus, even in DRAM's where heat dissipation is not a problem, it is nevertheless important to reduce power consumption to extend operating time for portable systems because such a large portion of the overall system power is consumed by the DRAM's.

SUMMARY OF THE PRESENT INVENTION

A battery-powered portable radio device embodiment of the present invention saves on the overall power consumed by the whole device by skipping unnecessary read, write, and refresh cycles of the internal main memory DRAM core. Streaming data input from a radio receiver is analyzed by a vector processor. The DRAM main memory and the vector processor itself share real estate on a common semiconductor chip. This allows a very wide row of DRAM memory to communicate 1024 bits wide with an eight-line cache. Six lines of the cache are reserved for memory operations, and two lines are reversed for I/O operations. Streaming data from the radio receiver is stored up in the DRAM main memory via the two I/O cache lines. As raw data is needed by the vector processor, whole DRAM rows are downloaded to the six lines of memory cache. The single-instruction multiple data vector processor rolls intermediate data around through the cache without causing it to write back to the DRAM. Any lines in the cache that will never be needed again, or that will be overwritten, are not written back. Any rows of data in the DRAM that will never be read or that will be overwritten are not refreshed. Each skipped read, write, or refresh of a row in the DRAM main memory saves significant battery power overall.

DETAILED DESCRIPTION OF THE PRESENT INVENTION

Figure 1:
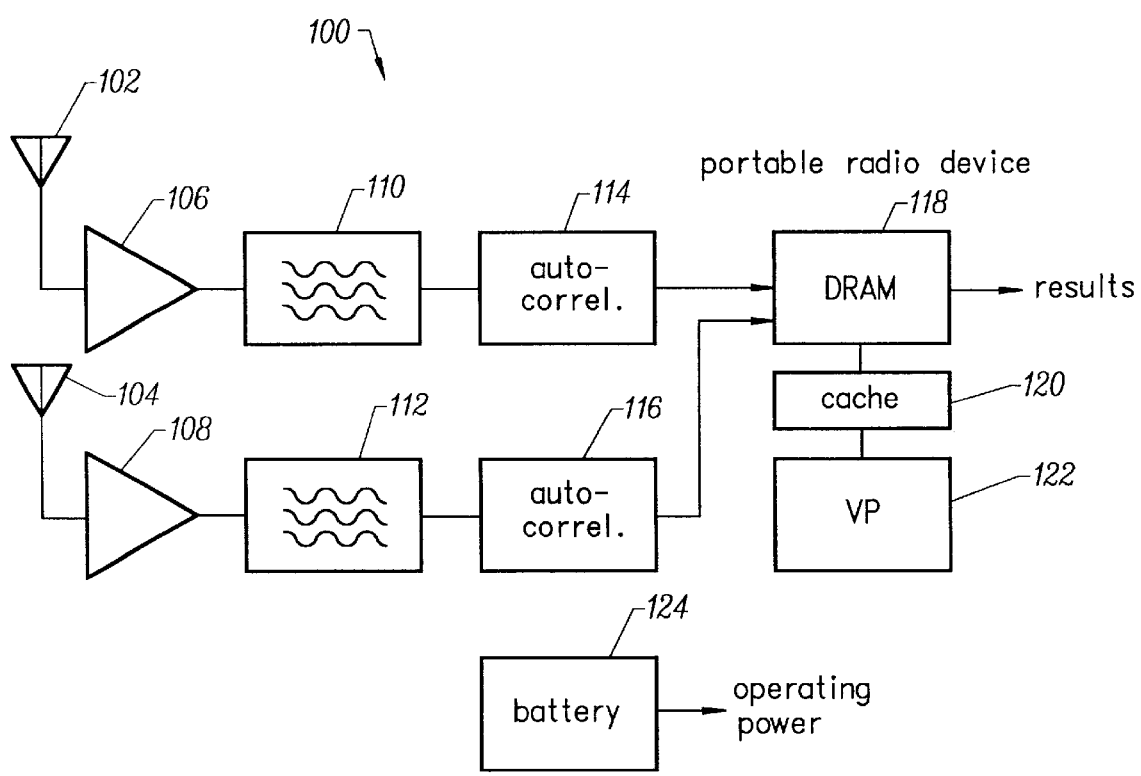
FIG. 1 is a functional block diagram of a portable radio device embodiment of the present invention.

FIG. 1 shows a portable radio device 100 in a preferred embodiment of the present invention. A pair of spatially diverse radio receiver antennas 102 and 104 provide respective analog signals to a pair of radio frequency (RF) amplifiers 106 and 108. A pair of RF filters 110 and 112 provide for the bandpass of a part of the radio spectrum that is of interest. In an exemplary cellular telephone application, a pair of auto-correlation units 114 and 116 process code-division multiple access (CDMA) signals transmitted from remote cellular telephones. The outputs of these are digitally sampled and serially fed as realtime streaming data into a dynamic random access memory (DRAM) 118 for digital signal processing (DSP). Each read, write, or refresh of a storage location within the DRAM 118 consumes a small pulse of power. Such power consumption in a portable radio device 100 is significant, and the operating power to continue running is precious. A very wide row-line cache memory 120 is used to limit the number of read, write, and refresh accesses that are required of DRAM 118 by a vector processor 122. A battery 124 powers all the other elements of device 100 during its portable operation. The life of the battery 124 is quite limited, so it is crucial that the other elements do not draw excessive or unnecessary power.

The cache 120 in FIG. 1 is not the usual kind of cache one would encounter in a personal computer or microcomputer workstation. In conventional cache memory systems, caches help where there exists a temporal locality between data items. In the application illustrated in FIG. 1, there is a spatial locality between data items that can be exploited by a cache. During the processing of data, the vector processor 122 will usually need some piece of data that is located nearby, e.g., in the same line of cache or the next line of cache. Once data is processed, the streaming data input is usually discarded and will never be revisited. Given this characteristic, it is pointless to waste DRAM main memory space or power cycles to store such data. So there is no temporal locality of data items that bears on the SRAM cache operation.

The number of lines implemented in the cache 120 must be the minimum that will suit the application. This can be empirically determined. Each line of cache 204 consumes significant amounts of chip real estate and operating power due to the construction of each SRAM memory cell. Embodiments that perform Fast Fourier Transforms can need as may as nine whole lines. Others that do simple convolutions need only two lines.

Figure 2:
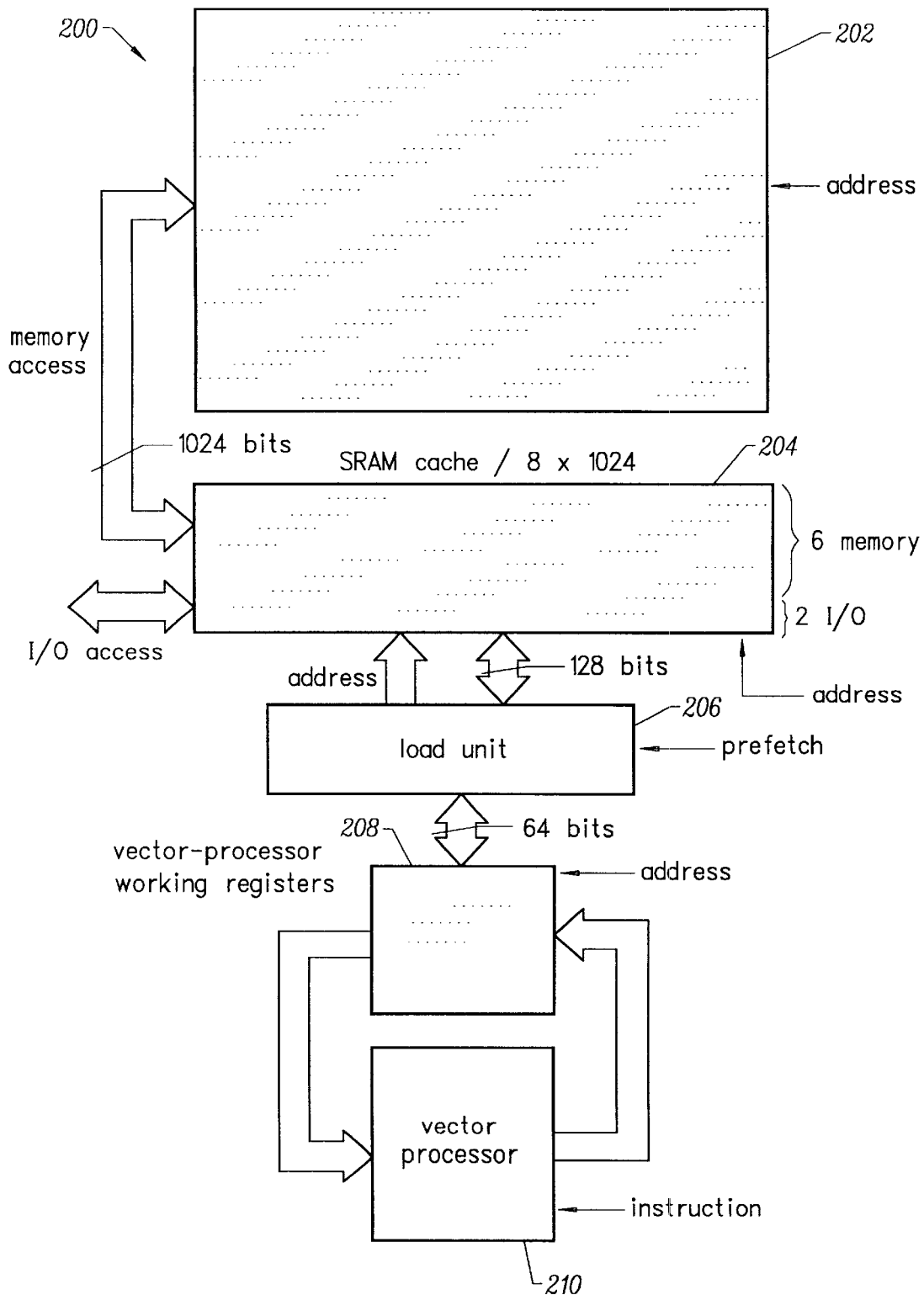
FIG. 2 is a functional block diagram that details the structure and interconnection of the DRAM main memory, SRAM cache, load unit, working registers and vector processor that share a single semiconductor chip in the device of FIG. 1.

FIG. 2 details the structure and interconnection of a memory-vector-processor combination 200 that includes a DRAM main memory 202, an SRAM cache 204, a load unit 206, a set of working registers 208 and a vector processor 210 that share a single semiconductor chip. The memory-vector-processor combination 200 is similar to the DRAM 118, cache 120, and VP 122 combination shown in the portable radio device 100 of FIG. 1. The DRAM 202 has a typical 1024-row by 1024-column organization. The SRAM cache 204 provides fully associative cache support with eight 1024-bit lines, e.g., in two partitions. In the example shown here, two of these lines are reserved for external data input/output (I/O), and six are reserved for memory accesses with the DRAM 202. Each row line in the cache 204 is as wide as the column-width of a row in the DRAM 202. Which rows in the DRAM 202 and which lines in the SRAM cache 204 that are to be involved in data exchanges is controlled by the "address" lines from a cache-controller.

The load unit 206 allows either the lower or upper 64-bits of a 128-bit word selected from the SRAM cache 204 to be fed to the working registers 208. This mechanism allows a rapid and efficient way for the vector processor 210 to operate on two or more nearby items in the streaming data.

The vector processor 210 of FIG. 2 operates on long arrays of data that are streaming-in in realtime. Each instruction executed in the vector processor 210 operates on a small portion of the datastream. In one embodiment, the vector processor 210 comprises five or six logic-device adders. When a calculation requires the results of a previous result, or when all the arguments for a calculation cannot be brought-in in a single clock cycle, the load unit 206 and SRAM cache are manipulated to circulate the intermediate arguments in a loop back around to the input of vector processor 210.

The vector processor 210 runs much faster than the DRAM memory 202. In one embodiment, instructions in the vector processor 210 were executed in one system clock cycle, but memory transfers required ten such system clock cycles. So it was important in this case to have the program instructions include prefetch commands that could trigger a memory access before it was actually needed. This is sometimes referred to as "just-in-time" prefetching. The program instructions therefore affect the cache 204. This then constitutes a software-managed vector cache for real-time streaming data. The result is an ability to operate at the bandwidths required in the application diagrammed in FIG. 1, and other demanding applications as well.

Realtime processing requires that the vector processor 210 have access to the necessary data within particular time bounds. So "flags" are added to the vector instructions to signal a prefetch of large blocks of data. Each vector instruction therefore looks like that in Table 1.

TABLE I

| (Vector Instruction) | | |
|---|---|---|
| opcode | operand | flags |

In communication applications, the relevant data is grouped close to one another, e.g., the data is vector-like with a stride of one. (A stride of two implies relevant data is in every other data word.) The data required by the vector processor 210 is prefetched just-in-time and cache 204 is operated as a fully associative vector stream cache. Because the stride is one and spatial locality exists, a prefetch of the next data word, whatever it contains, will be useful. The access latency of the DRAM 202 is thus hidden by the prefetch.

The present invention therefore uses a combination of software and hardware methods and structures to guarantee realtime availability of the data while using a minimum of chip real estate and operating power.

Writes from cache 204 to DRAM 202 are neither "write-through" nor "write-back" prior art policies. The policy used in the present invention is called by the present inventors, "write scrubbing," which is something in between the two conventional cache write policies. Data is not written through, because this could allow unnecessary write cycles in the DRAM 202 that would waste power. Data is not strictly written-back from the cache 204 because such operations could undermine realtime operation. Software instructions are depended upon to know when and what should be written back to DRAM 202. Such write-scrubbing has the important benefit of making fewer lines necessary in the cache 204.

Since the signal processing of data usually sweeps the memory space, it is possible to proactively write back the cache 204. Data in the lines of the cache 204 can be "evicted" quickly because the real bandwidth between the cache 204 and DRAM 202 is so large. This results from the 1024 hardware lines that exist between them made possible by integrating both on the same chip. The flag area shown in Table I also includes a "store-through" flag that controls the write-scrubbing.

Such software-generated triggers allow the "working-set" of cache lines in the vector stream cache 204 to be minimized. This appears to behave at times as a "write-through" cache, and at other times as a "write-back" cache. A "write-back" cache policy is usually good for minimizing energy consumption. If the write back is done using hints from the program software for cache lines which have to be written-back anyway, then the best of both methods is obtained.

Figure 3:
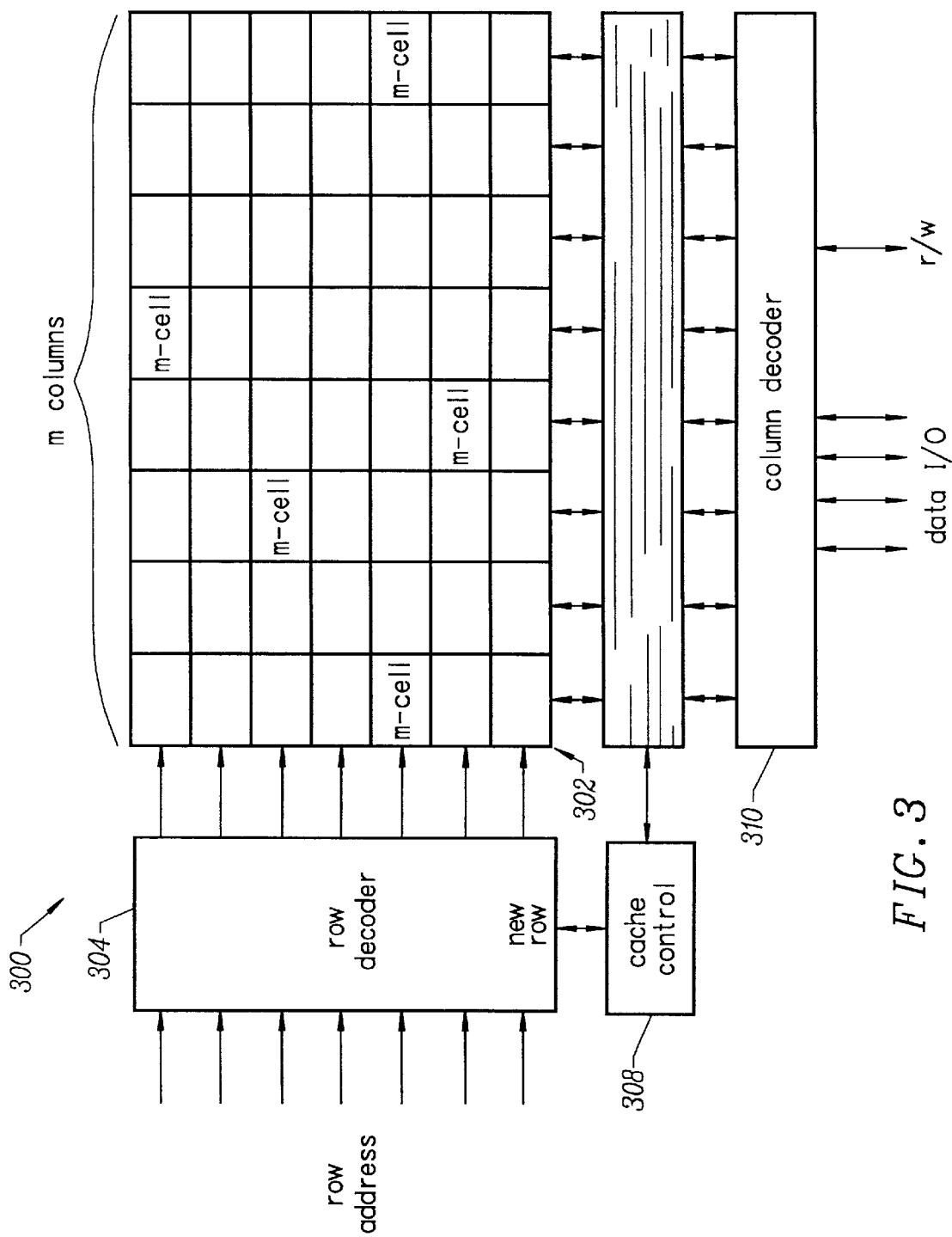
FIG. 3 is a functional block diagram of a dynamic random access memory (DRAM) in accordance with the present invention.

In FIG. 3, A DRAM memory 300 has a core of memory cells ("core memory") 302 that is organized with m-number of columns and n-number of rows. Such DRAM is similar to DRAM 118 in FIG. 1 and DRAM core 202 in FIG. 2. Preferably, the number of columns and the number of rows (m>n) is such that the physical layout is very wide when contrasted with the height. In prior art DRAM's, the width and height are the same so the layout approximates a square. The wide aspect ratio is especially possible where the entire DRAM system 300 is embedded on a single semiconductor chip in proximity to a central processing unit (CPU), and so such designs are preferred and derive the best benefits of the present invention. Specifically, reduced power consumption can be realized by using very wide 20 DRAM rows. It is intended that the DRAM 300 be embedded on a larger microcomputer or digital signal processor chip so the access between the DRAM 300 and CPUs will not be affected by packaging pin limitations. A row address decoder 304 converts the upper bits of a memory access address to a one-of-n selection that will activate one row of memory cells for read, write, or refresh accesses.

A set of eight fully-associated row-line caches in a cache 306 are used. These are preferably implemented in static random access memory (SRAM) and can be electronically rotated. Particular applications may not need eight full rows, as few as two or three full rows have provided good results in special cases. The number of rows to use in the row-line cache 306 is empirically determined. Each row-line cache maintains a "dirty" bit (D) and a "valid" bit (V) that are used to describe the contents. In a "read-once" instance, D=0 and V=1. In a "write to destroy" instance, D=1 and V=1. The cache 306 further includes information identifying which rows of memory cells in the memory core 302 have been transferred into the row-line cache. Data can be read from an activated row in the memory array to a row-line cache 306, and in such case the data left behind in the activated row will become corrupted. Such phenomenon is known as "destructive read". Data can also be written to the activated row a whole line at a time from the row-line cache 306.

Conventional DRAM devices necessarily follow every read access with a write-back cycle to restore the data in the row accessed. The write-back cycle is needed because the read operation is destructive in most DRAM's. Each of the read accesses and the write-back cycles consumes a pulse of power that must come from the battery. This, of course, is assuming that the DRAM 300 is used in battery operated portable equipment, thus making the power consumed in the memory a critical issue.

In DRAM embodiments of the present invention, data that are to be read, modified, and written back by the processor are identified, and the DRAM is not allowed to perform an automatic write-back cycle after the first read access. Such write-back data represents the old data before they are modified by the processor.

A cache control 308 receives a signal from the row decoder 304 indicating that a new row is being accessed. The cache control 308 must then decide if it has a row of data in it that must to be written back to the memory core 302 before it downloads a new row. A "dirty" flag is used to mark a row that has been destructively read but not yet written back. Such dirty flags are shown in FIG. 3 as being included in the memory core 302.

The very wide row of data held in the row line cache 306 is selectively accessed b y a column decoder 310. Any bit, byte, word, double-word, or even the whole row can be selected. An external CPU can read or write the involved bits without affecting the non-involved bits.

Figure 4:
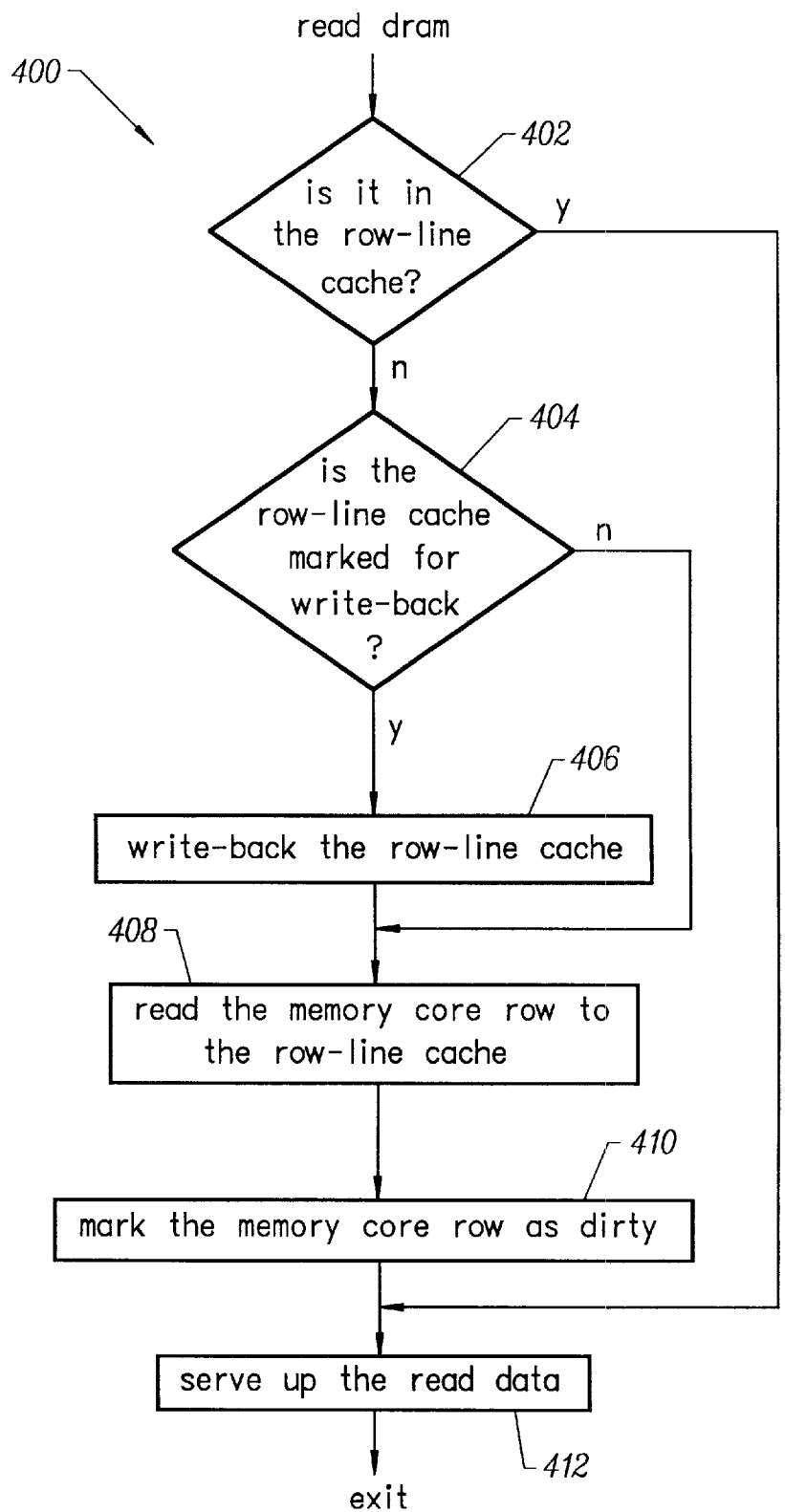
FIG. 4 is a flow chart of a read access method in accordance with the present invention.

FIG. 4 represents a read-DRAM method 400 in a preferred embodiment of the present invention. The read-DRAM method 400 is preferably implemented with the hardware of DRAM 300 (FIG. 3). Any CPU read access in step 402 requires a determination if the read access involves data that are already in the row cache. Besides the dirty and valid bits described, a conventional tag memory common to cache memories could be used to assist this decision. If the data to be read are not in the row-line cache in step 404, a determination is made if the data currently in the row-line cache must be written-back or flushed to the memory core before new data are downloaded to it. If so, the write-back is performed in step 406.

A pulse of power is used from the battery power supply during the write-back. To save power these cycles are kept to a minimum. The row of data is then read from the memory core to the row-line cache in step 408. The row in the memory core is marked as being dirty in step 410 because an unavoidable destructive read has corrupted the row in the memory core. A pulse of power is used from the battery power supply during the memory core read access. To save power, these cycles too are kept to a minimum.

The system can then deliver the requested data from the row-line cache in bits, bytes, words, double-words, or even the whole row in step 412. If the requested data are in the row line cache in step 402, the process delivers the requested data immediately in step 412. If the row in the memory core is not marked for write-back in a previously accessed row then in cache in step 404), then the row of data can be read from the memory core to the row-line cache in step 408.

Figure 5:
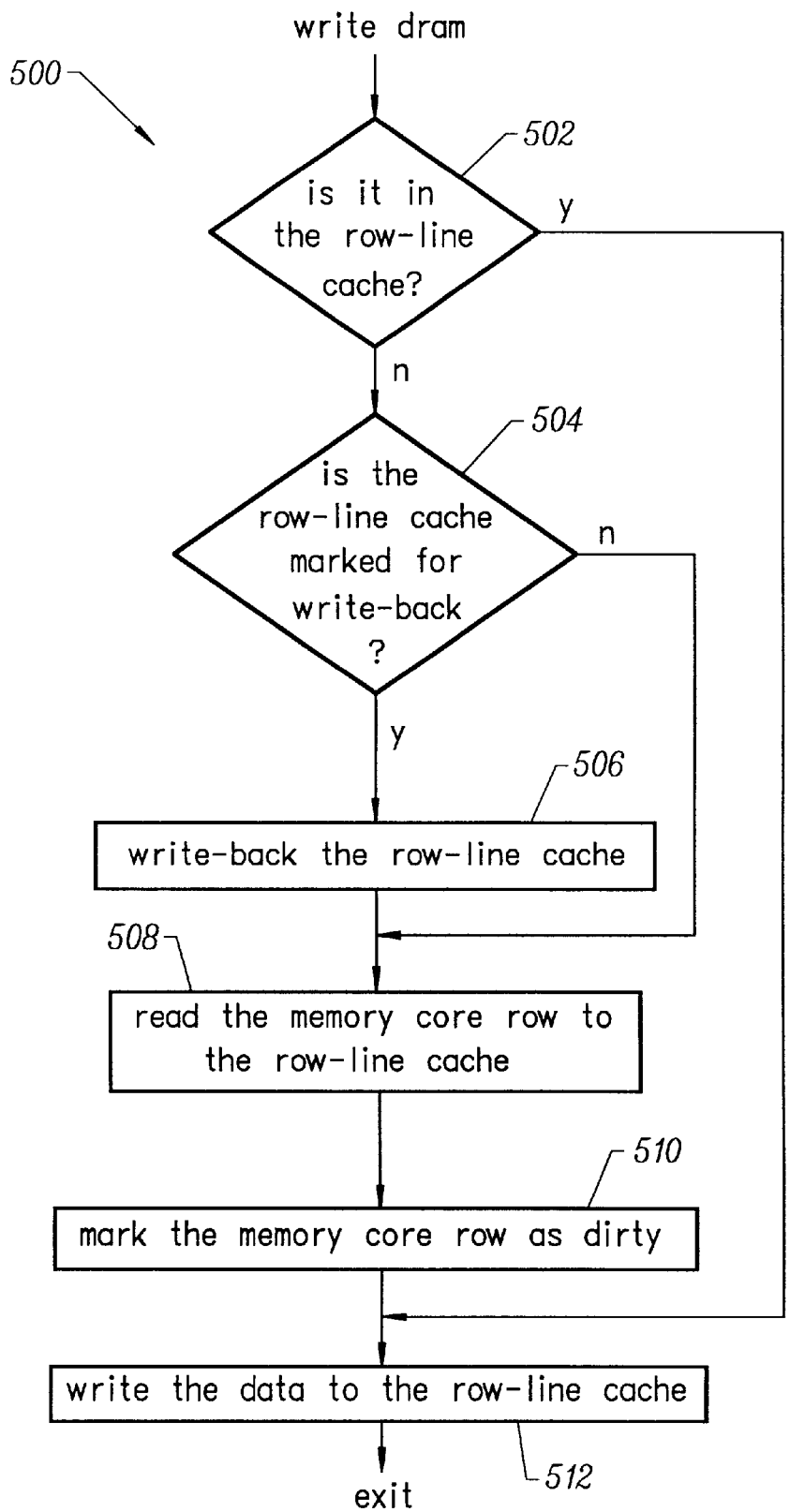
FIG. 5 is a flow chart of a write access method in accordance with the present invention.

FIG. 5 represents a write-DRAM method 500 in a preferred embodiment of the present invention. The write-DRAM method 500 is preferably implemented with the hardware of DRAM 300 (FIG. 3). Any CPU write access causes a determination in step 502 if the write access involves data that are already in the row cache. If not, the row in the memory core must be brought to the row-line cache first. If another data row is already in the row-line cache, a few preliminary steps must be taken. A determination must be made in step 504 if the data in the row-line cache are marked for a write-back to the memory core, e.g., the dirty and valid bits will be inspected. If so, the write-back is performed in step 506. Now the row-line cache is free for new uses. The row in the memory core that is to be written is read 508, and the row is placed in the row-line cache. The row in the memory core is marked as dirty 510 because the transfer operation necessarily corrupts the row data left behind in the memory core. The data are allowed to be written from the CPU to affect selectively the bits in the row-line cache that correspond to the system address and a bit/byte/word/row mode in step 512. If the affected row to be written is already in the row-line cache, the method proceeds directly to the write-back step 512. If the data in the row-line cache in step 504 are not marked for write-back, then that cycle can be skipped and the process can proceed directly to reading the row in the memory core in step 508.

Figure 6:
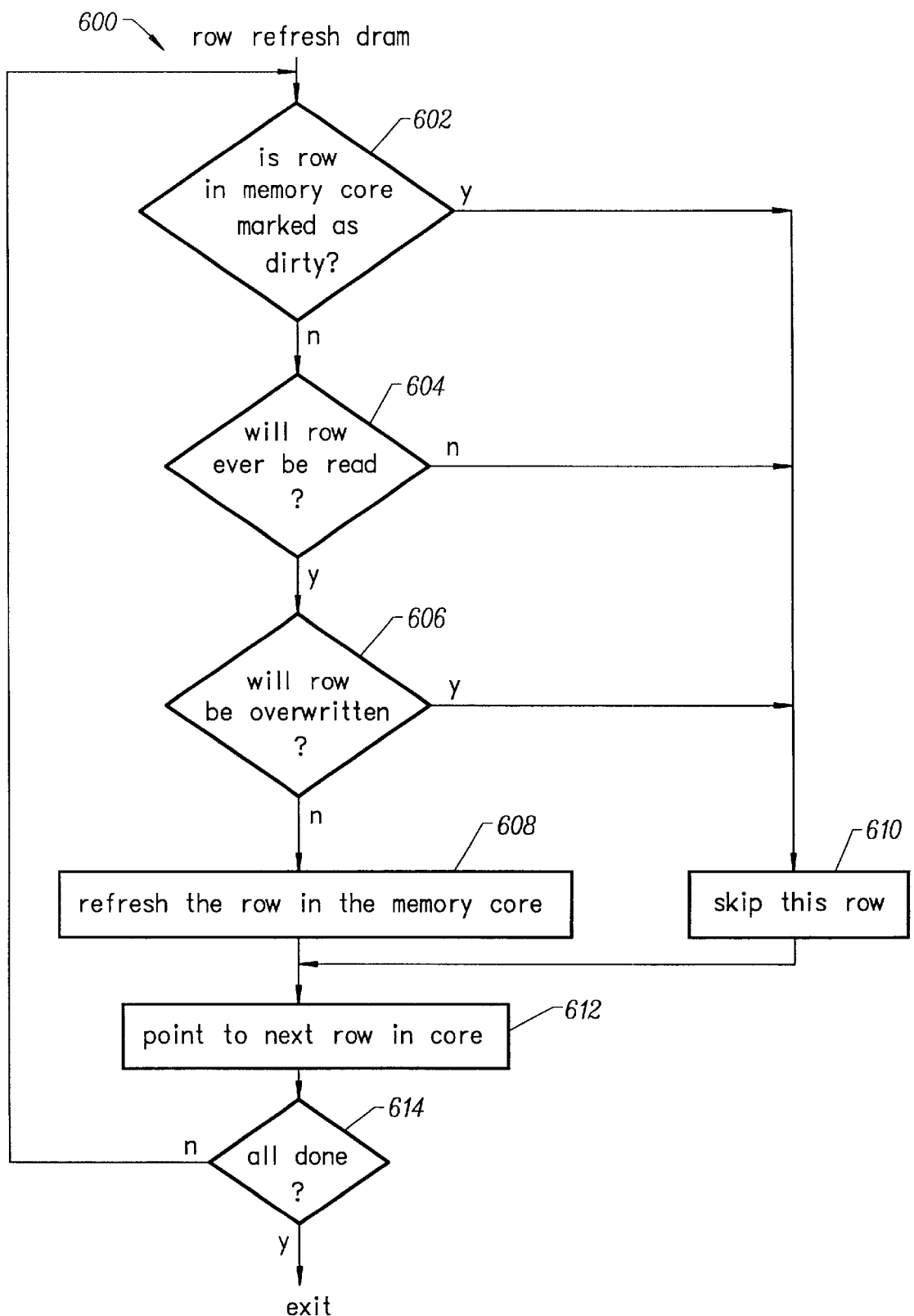
FIG. 6 is a flow chart of a row refresh access method in accordance with the present invention.

A row refresh method 600 of the present invention is illustrated in FIG. 6. The object of the method is to conserve power by refreshing only those rows in the DRAM that need to be refreshed. Whole rows of data which will be never read, or overwritten, or that will be read but discarded can be skipped. A determination is made in step 602 if the row to be refreshed is dirty. If not, a determination is made in step 604 if the row is ever to be read. An application program running on the CPU could reasonably know this and be able to communicate this information to the DRAM. A determination is made in step 606 if the row in the DRAM memory core is to be overwritten, e.g., without first being read. If not, the row is refreshed in step 608 by reading it, amplifying it, and writing it back. A refresh cycle that simply does this is conventional.

The decision to skip the refresh based on some intelligence and to save power is a key point of the present invention. The current row is skipped in step 610 in the memory core and the method proceeds to the next row if there is no need to perform the refresh cycle. A refresh controller is then pointed to the next row in the DRAM memory core in step 612. A determination is made in step 614 if all the rows in the DRAM memory core have been refreshed. If not, the steps 602–612 are repeated.

Although the present invention is described herein with reference to the preferred embodiment, one skilled in the art will readily appreciate that other applications may be substituted for those set forth herein without departing from the spirit and scope of the present invention. Accordingly, the present invention should only be limited b y the Claims included below.

What is claimed is:

1. A method for reducing power consumption in portable electronic devices that include digital signal processing of streaming realtime data with a vector processor, the method comprising:

storing streaming realtime data in a dynamic random access memory (DRAM) core which is organized as n-rows by m-columns;

transferring various particular rows of data to a fully-associative cache m-columns wide in response to prefetching flags included in particular instructions of a program software for said vector processor;

circulating outputs from said vector processor as intermediate arguments through a load unit interposed between said vector processor and said cache in order to save power by not instigating a read or write cycle in said core;

write-scrubbing said various particular rows of data in said fully-associative cache m-columns wide to said core in response to write-scrubbing flags included in particular instructions of a program software for said vector processor;

for any vector processor read access, deciding if a read access involves data that is already in any row-line of said cache;

if said data to be read is not in said row-line of said cache, deciding if said data currently in said row-line of said cache needs to be written-back or flushed to said core before new data is downloaded to it;

if so, performing said write-back wherein a pulse of power will be used from a battery power supply during said write-back, and to save power such cycles are kept to a minimum;

reading a row of data from said core to said row-line of said cache, wherein a pulse of power is used from said battery power supply during said core read access, and to save power these cycles too are kept to a minimum;

marking said row in said core as being "dirty" due to an unavoidable destructive read that corrupted said row in said core; and serving up requested data.

2. The method of claim 1 wherein:

the step of serving-up includes serving up said requested data from said row-line of said cache in bits, bytes, words, double-words, or whole said row.

3. The method for reducing power consumption of claim 1, wherein:

the first step of deciding is such that if said requested data is in said row line cache, then requested data is served up.

4. The method of for reducing power consumption of claim 1, wherein:

if said row in said core is not marked for write-back in a previously accessed row then in cache, then said row of data is read from said core.

5. The method of claim 1, wherein said prefetching flags causes at least one line of the core to be downloaded just-in-time to the row-line cache.

6. The method of claim 1, wherein said write-scrubbing flags permits a reduction in the number of rows required for realtime operation in said row-line cache, and the number of such rows is implemented as empirically determined.

7. The method of claim 1, wherein said battery is a portable power source for said memory, said row-line cache, and said vector processor.

8. The method of claim 1, wherein said memory is connected to receive realtime streaming data from a radio receiver and said vector processor is used for digital signal processing in a device having a limited-life battery.

9. The method of claim 1 further comprising:

providing from a controller for no write-back of any data in said row-line cache to said memory if such data will never be read.

10. The method of claim 1 further comprising:

providing from a controller for no write-back of any data in said row-line cache to said memory if such data will be ultimately overwritten.

11. The method of claim 1 further comprising:

providing from a controller for no write-back of any data in said row-line cache to said core if such data will be read but then be dumped.

12. The method of claim 1 further comprising:

providing from a controller no refresh of any data in the memory if a corresponding row containing such data is marked as dirty, will never be read, will be ultimately overwritten, or if such data will be read but then dumped.

13. A method of operating a vector processor embedded in a single chip with a dynamic random access memory (DRAM) core as its main memory, the method comprising the steps of:

storing streaming realtime data in said core which is organized as n-rows by m-columns;

transferring various particular rows of data to a fully-associative cache m-columns wide in response to prefetching flags included in particular instructions of a program software for said vector processor;

circulating outputs from said vector processor as intermediate arguments through a load unit interposed between said vector processor and said cache in order to save power by not instigating a read or write cycle in said core; and write-scrubbing various particular rows of data in said fully-associative cache m-columns wide to said core in response to write-scrubbing flags included in particular instructions of a program software for said vector processor;

for any vector processor read access, deciding if a read access involves data that is already in any row line cache;

if said data to be read is not in said row-line of said cache, deciding if said data currently in said row-line of said cache needs to be written-back or flushed to said core before new data is downloaded to it;

if so, performing said write-back wherein a pulse of power will be used from a battery power supply during said write-back, and to save power such cycles are kept to a minimum;

reading said row of data from said core to said row-line of said cached, wherein a pulse of power is used from said battery power supply during said core read access, and save power these cycles too are kept to a minimum;

marking said row in said core as being "dirty" due to an unavoidable destructive read that corrupted said row in said core;

serving up requested data;

for any vector processor write access, deciding if a write access involves data that is already in any row cache if not, transferring any row in a core to said row-line of said cache first;

deciding if said data in said row-line cache is marked for a write-back to said core;

if so, doing said write-back so said row-line of said cache first;

reading said row in said core that is to be written, and placing said row in said row-line of said cache;

marking said row in said core as "dirty" because said transfer operation necessarily corrupted said row data left behind in said core;

allowing said data to be written from said vector processor to selectively affect said bits in said row-line of said cache that correspond to a system address and a bit/byte/word/row mode;

deciding if any row in core to be refreshed is "dirty";

if not, deciding if said row will be overwritten without first being read; and if not, refreshing said row by reading said row, amplifying said row, and writing said row back.

* * * * *